Oct. 5, 1971 M. BRAM 3,609,885
AUDIO-VISUAL TEACHING DEVICE
Filed Aug. 5, 1969 2 Sheets-Sheet 1

INVENTOR
MORRIS BRAM

BY Benjamin J. Barish

ATTORNEY

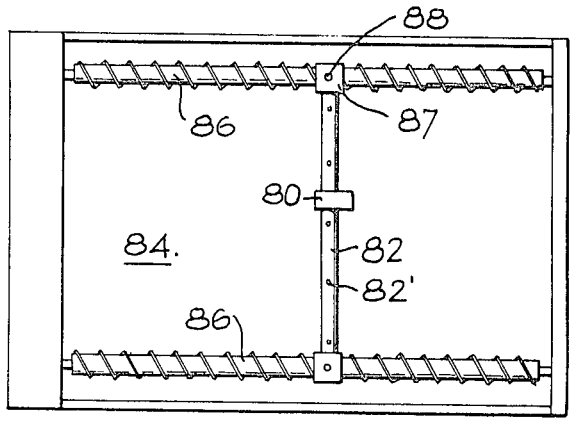
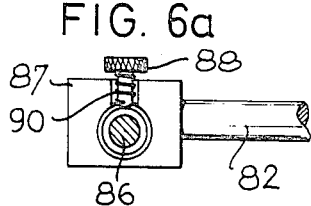
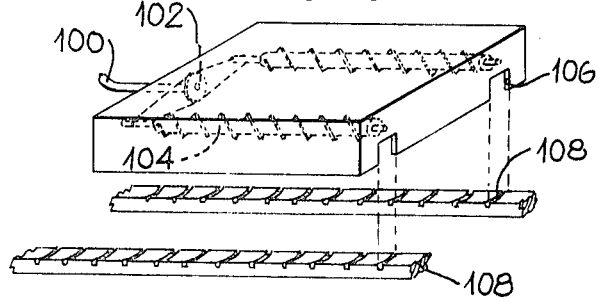
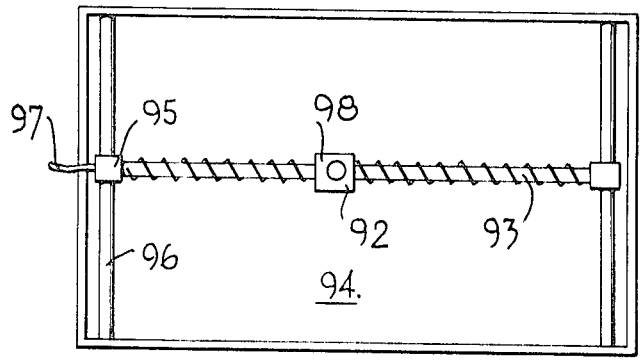

United States Patent Office 3,609,885
Patented Oct. 5, 1971

3,609,885
AUDIO-VISUAL TEACHING DEVICE
Morris Bram, 523 Compton Ave., Bronx, N.Y. 10472
Filed Aug. 5, 1969, Ser. No. 847,579
Claims priority, application Israel, Aug. 7, 1968, 30,512
Int. Cl. G09b 5/06
U.S. Cl. 35—35 C                                    2 Claims

ABSTRACT OF THE DISCLOSURE

An audio-visual teaching device includes a table for receiving a record sheet carrying one or more printed lines of visual information, and an audio information recording strip for, and correlated to, each of the printed lines of printed information, a pick-up head adapted to scan the audio information recording strip or strips, means mounting the pick-up head over the table enabling the head to be placed by the user at any selected portion of a printed line and/or at any selected printed line so as to scan and to convert to sound only the audio information recorded with respect thereto, and a drive for the pick-up head for driving same at a constant speed along the recording strip or portion thereof corresponding to the printed line or portion thereof selected.

BACKGROUND OF THE INVENTION

Field of the invention

The present invention relates to audio-visual teaching devices, and particularly to devices which may be used for teaching subjects which can be programmed for aural and visual presentation.

Description of the prior art

Audio-visual teaching devices are known which include printed visual information, e.g., words or pictures, and recorded (usually magnetically) audio information correlated to the visual information. Such devices are used for the teaching of reading, foreign languages, musical notations, and for other applications. For example, one such known device includes a recording and playback unit using cards each bearing printed information (such as the name and picture of, e.g. an apple) and the word corresponding to such printed information magnetically recorded thereon. The user (e.g. a child) reads out loud the printed information, inserts the card into the machine, and then listens to the magnetically recorded words to compare what he had heard to what he has read or said out loud.

The known audio-visual teaching devices are generally of very limited use and capacity, particularly with respect to teaching children to read continuous passages. For example, they usually use cards bearing only one or two words, or at most a single line. In addition, such known devices do not effectively prevent such reading blocks as "inversion" from developing. "Inversion" is a psychological block well known to educators whereby the child learning to read sometimes unconsciously inverts the order of letters of a word, e.g. reading "saw" as "was," and "on" as "no." Other known audio-visual teaching devices are of very complicated and costly construction and therefore of limited use.

A broad object of the present invention is to provide a novel and improved audio-visual teaching device having improved characteristics in one or all the foregoing respects.

A further object of the invention is to provide "talking record sheets" and "talking books" for use in the audio-visual teaching device of the present invention.

SUMMARY OF THE INVENTION

According to a broad aspect of the present invention, there is provided an audio-visual teaching device characterized in that it includes a table for receiving a record sheet carrying one or more printed lines of visual information, and an audio information recording strip for, and correlated to, each of the printed lines of visual information. A pick-up head is adapted to scan the audio information recording strip or strips, and means mount the pick-up head over the table enabling the pick-up head to be placed by the user at any selected portion of a printed line and/or at any selected printed line on the sheet if it is one carrying a plurality of printed lines so as to scan and to convert to sound only the audio information recorded with respect to the selected printed line or the selected portion thereof. The pick-up head is driven at a constant speed along the recording strip or portions thereof corresponding to the printed lines or portion thereof selected.

Preferably, the record sheet has a plurality of lines of visual information printed thereon, and a plurality of correlated audio information recording strips, the pick-up head being adapted to be placed by the user at any selected portion of a printed line and also at any selected printed line.

A device constructed as above defined is expected to be of great help in teaching young children to read. In use, the child selects a portion of a printed line, or a complete printed line if a plurality are included, places the pick-up head there, and then watches the head move along the printed line while he hears the audio information recorded with respect to the selected printed information. He thus actively participates physically and mentally in the learning process. This maintains his interest. In addition, by watching the head move along the printed line as he hears the words reproduced, reading blocks such as "inversion" are effectively minimized. Further, the capacity of the machine is greatly increased over the known devices particularly when the device is used with record sheets carrying a plurality of printed lines and recording strips.

Several forms of the invention are described below for purpose of example.

The present invention also provides record sheets for use with the novel audio-visual-teaching device, and a book including a plurality of such record sheets.

Further features and advantages of the invention will be apparent from the description below.

BRIEF DESCRIPTION OF THE DRAWINGS

The invention is herein described, somewhat diagrammatically and by way of example only, with reference to the accompanying drawings, wherein:

FIG. 6 is a plan view of a further device constructed in accordance with the invention;

FIG. 6a is an enlarged fragmentary view of a part of FIG. 6; and

FIGS. 7 and 8 illustrate two further devices constructed in accordance with the invention.

DESCRIPTION OF THE PREFERRED EMBODIMENTS

Figure 1:
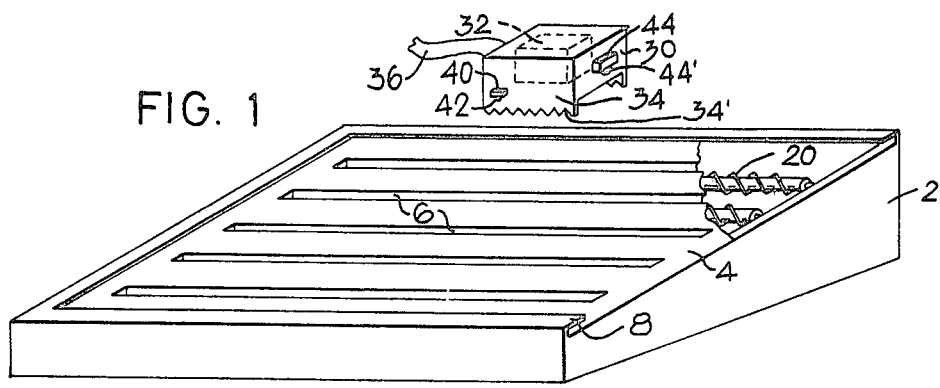
FIG. 1 is a perspective view illustrating one form of audio-visual teaching device constructed in accordance with the invention.
Figure 2:
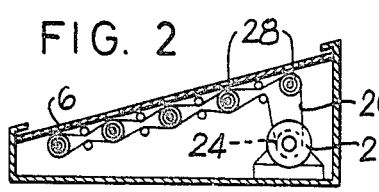
FIG. 2 is an end view of the device of FIG. 1, illustrating the drive.

With reference to FIGS. 1 and 2, the device illustrated includes a housing 2, which may be of plastic, having a flat inclined table 4 formed with a plurality of parallel, longitudinally-extending, equally-spaced slits 6. A frame 8 circumscribes the table on three sides, the frame being open at one side (the right side in FIG. 1) through which open side the record sheet may be inserted so as to lie flat on the table.

Figure 3:
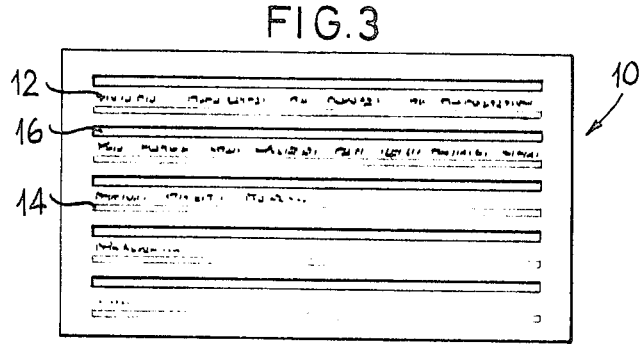
FIG. 3 illustrates the record sheet for use with the device of FIGS. 1 and 2.

The record sheet, generally designated 10, is illustrated for purposes of example in FIG. 3. It may be made of paper or plastic and includes a plurality of lines 12 of visual information printed thereon, such as words, sentences, pictures etc. It also includes a plurality of correlated lines 14 of a record medium for recording audio information, these lines preferably being in the form of magnetic tracts for magnetically recording the information. The record sheet 10 further includes a plurality of slits 16 adapted to be aligned with slits 6 in table 4 when the record sheet is inserted into the device. The magnetic tract 14 disposed between a pair of slits is correlated to the printed information appearing in the printed line above the upper one of that pair of slits.

Figure 4:
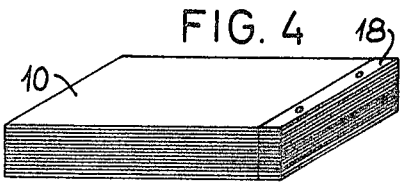
FIG. 4 illustrates a book including a plurality of the record sheets of FIG. 3.

FIG. 4 illustrates the plurality of the record sheets 10 held in a binder 18 forming a book.

Disposed within housing 2 and under table 4 are the drive elements in the form of worm gears 20 each aligned with one of the slits 6. Worm gears 20 are driven by an electric motor 22 (FIG. 2) also disposed within housing 2, the motor driving a pulley 24 which is coupled by belt 26 to the pulleys 28, one of which is fixed to each of the worm gears 20. As can be seen in FIG. 2, belt 26 engages all the pulleys 28 in series so as to rotate them, and worm gears 20, in the same direction. Preferably belt 26 is a no-slip, flexible, rubber belt of known construction effective to drive all the worm gears 20 at the same constant speed.

The device also includes a portable scanning unit 30 including a magnetic pick-up head 32 disposed within a housing having a pair of depending side plates 34. The lower edges of the side plates are formed with teeth 34' adapted to engage the worm gears 20 of the drive for propelling the pick-up head 32 across the record sheet at a constant speed. The head 32 is connected by conductors 36 to an audio amplifier and speaker, or earphones (not shown) for converting the magnetically recorded information into sound that may be heard by the user.

In using the device, the user inserts the record sheet 10 on table 4 with the slits 16 of the sheet aligned with slits 6 of the table. The user then selects a line of printed information 12 to be read, or a portion of that line, and inserts the side plates 34 of the scanning unit 30 into the pair of slits 6 directly below the selected line of printed information so that it overlies the line of recorded audio information 14 on the record sheet correlated to the selected line of printed information. The side plates 34 are inserted into the slits 6 with the teeth 34' meshing with the worm gears 20, whereby the latter propel the scanning unit at a constant speed across the selected line, or selected portion, of recorded audio information.

The device also includes a switch for starting the drive upon insertion of the head 30. This is schematically illustrated in FIG. 1 by micro-switch 40 carried by one of the side plates 34 of the scanning unit, the switch having a button 42 which is engaged by the table upon insertion of the unit to turn-on the electric motor 22. A manual starting switch could be provided instead of micro-switch 40. The device also includes a limit switch on the head, schematically illustrated at 44, having an operator 44' projecting into a slit 6 and engageable by the end thereof to turn-off the power to the motor drive when the head has reached the end of the line.

Figure 5:
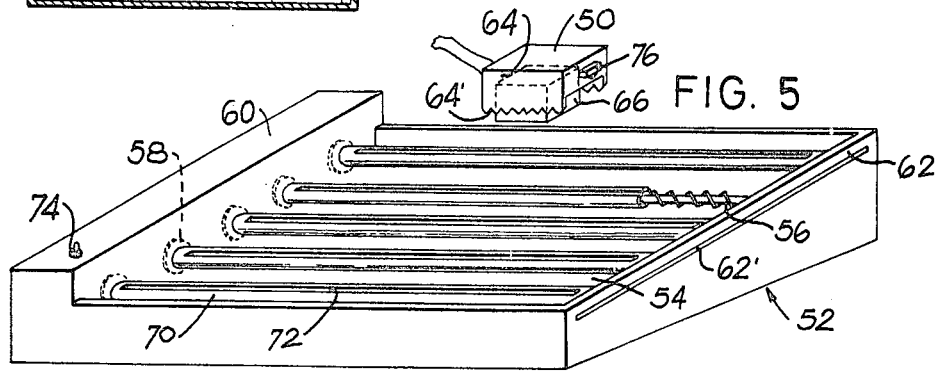
FIG. 5 is a perspective view illustrating a second device constructed in accordance with the invention.

In the device illustrated in FIG. 5, the drive for the scanning unit 50 is not disposed within the housing 52 but rather is disposed above the table 54 of the housing. This arrangement obviates the necessity of providing slits in the table or in the record sheets.

In FIG. 5, the drive includes a plurality of elongated elements in the form of equally-spaced worm gears 56 disposed above the table. There are a pair of such worm gears for each line of recorded audio information, and they are disposed so as to straddle and to extend parallel to it when the record sheet is inserted onto the table. The worm gears 56 are each driven by a pulley 58 disposed in one raised end 60 of housing 52. The worm gears 56 are journalled between the latter end of the housing and a side plate 62 at the opposite side, so that the worm gears are spaced above the top of the table 54; side plate 62 is spaced slightly above the top of the top of the table to enable the record sheet to be inserted onto the table through the space 62' formed on the right side. The motor (not shown in FIG. 5) is disposed within housing 52 and is coupled to drive all the pulleys 58 in the same direction and at a uniform speed, as in the embodiment of FIGS. 1 and 2.

The scanning unit 50 in FIG. 5 is substantially the same structure as that in FIGS. 1 and 2, except that its side plates 64, which are also provided with teeth 64' at the lower edge for meshing with worm gears 56, are shorter and terminate above the bottom surface of the pick-up head 66. When scanning unit 50 is thus applied between a selected pair of worm gears, the pick-up head 66 extends below the worm gears into contact with, or very slightly spaced from, the record sheet, i.e. the selected line of recorded audio information on the record sheet.

Preferably, each of the worm gears 56 is enclosed in a sleeve 70, such as of plastic tubing, formed with an elongated slit 72 through which slit the side plates 64 of the scanning units are passed for engagement with the worm gears. The sleeves 70 thus provide a protective cover for the worm gears.

In the device of FIG. 5, a starting switch 74 is provided on the housing itself, and a limit switch 76 is provided on the scanning unit 50, the latter including an operator engageable with side plate 62.

In the device illustrated in FIG. 6, the scanning unit 80 is carried by a supporting member in the form of a bar 82 extending across the table 84 in the direction perpendicular to the lines of recorded audio information on the record sheet, when the latter is inserted into the device. The drive in FIG. 6 includes a pair of worm gears 86 extending parallel to the lines of recorded audio information, one at the upper end of the table and the other at the lower end of the table. The bar 82 carrying the scanning unit 80 is coupled at each of its opposite ends to a worm gear 86 by means of an apertured block 87 fixed to the bar and carrying a stud 88 urged by spring 90 into engagement with the threads of the worm gear.

Bar 82 is formed with a plurality of depressions or detents 82' cooperable with a protrusion (known per se, such as a spring-biased ball, not shown), formed in scanning unit 80, to enable the unit to be releasably positioned along bar 82 in alignment with a selected line of recorded audio information on the record sheet. In addition, bar 82 and scanning unit 80 may be moved horizontally to a preselected location of the line, by grasping the two studs 88 and pulling them upwardly against springs 90 so as to disengage the studs from the worm gears 86, permitting the bar to be manually moved horizontally along the worm gears 86'. The bar may also be moved horizontally by force without pulling up on studs 88.

The structure of the device in FIG. 6 is in the other respects substantially the same as in the previously described embodiments, including an electric motor for driving the worm gears 86 and also including starting and limit switches for terminating it when the scanning unit reaches the end of the line.

It will be appreciated that instead of worm gears 86, other driving members could be used, for example belts.

In the embodiment of FIG. 7, the scanning unit 92 is carried on and is driven along a single supporting member in the form of a worm gear 93 extending across the table 94 above and parallel to the audio-information recording strips. Worm gear 94 is mounted on a pair of end blocks 95 movable along tracks or bars 96 at the opposite sides of table 94. Worm gear 93 is driven by a flexible shaft 97 movable with the worm gear and connected at its opposite end to a drive motor (not shown). The scanning unit 92 may include a spring-biased stud 98, similar to the stud 88 arrangement illustrated in FIGS. 6 and 6a, for purposes of releasing the scanning unit from the worm gear to enable the head to be moved longitudinally, i.e. parallel to the magnetic tracts, for selecting a portion of the tract to be scanned. For selecting lines, the worm gear 93 together with its end blocks 95 are movable along tracks 96. Blocks 95 could be frictionally held within tracks 96 or conventional ball and detent means could be provided for retaining the blocks in a selected position in the tracks.

In the embodiment illustrated in FIG. 8, the driving elements for driving the pick-up head are disposed within the head itself, rather than in the housing of the device. As shown, a flexible shaft 100, connected at its opposite end to an electric motor carried in the device, is coupled to a pulley 102 which drives a pair of worm gears 104 within the scanning unit. The lower surface of the unit is formed with a pair of longitudinal recesses 106 to expose from below the two worm gears 104. The latter gears cooperate with longitudinally extending bars 108 carried above the table surface, these bars being formed with grooves adapted to mesh with worm gears 104. The user may place the scanning unit at any selected position along grooved bars 108, or between any selected pair of grooved bars assuming that the device is used with record sheets having a plurality of printed lines and recording tracts, in order to select the information to be scanned. Rotation of worm gears 104 by flexible shaft 100 propels the scanning unit along the sheet at a uniform speed. In all other respects, the device of FIG. 8 could be otherwise similar to that of FIG. 5.

It will be appreciated that instead of using flexible shaft 100, a small electric motor powered by a DC battery could be mounted within the head itself, but this may create electrical disturbances in the pick-up head.

Many other variations, modifications and applications of the described embodiments of the invention will be apparent.

What is claimed is:

1. An audio-visual teaching device characterized in that it includes a table for receiving a record sheet carrying a plurality of printed lines of visual information, and an audio information recording strip for, and correlated to, each of said printed lines of visual information, a pick-up head adapted to scan the audio information recording strips, mounting means mounting said pick-up head over said table enabling the pick-up head to be placed by the user at any selected printed line so as to scan and to convert to sound only the audio information recorded with respect theerto, and a drive for driving said pick-up head at a constant speed along the recording strip corresponding to the selected printed lines, said drive being disposed below the table, said table and also the record sheet including a pair of slits extending parallel to and straddling each audio information recording strip, said pick-up head including coupling means adapted to extend through said slits into engagement with said drive.

2. A device according to claim 1, wherein said drive comprises a worm gear for each of said slits and extending parallel thereto, and a motor for rotating said worm gears, said coupling means of the pick-up head including side plates formed at their lower ends with teeth adapted to mesh with said worm gears upon the insertion of the pick-up head side plates through the slits in the record sheet and table.

References Cited
UNITED STATES PATENTS

| | | | |
|---|---|---|---|
| 3,343,281 | 9/1967 | Greer Jr. et al. | 35—35 C |
| 3,416,241 | 12/1968 | Weitzner | 35—35 C |

WILLIAM H. GRIEB, Primary Examiner

U.S. Cl. X.R.

179—100.2 T